(12) United States Patent
Li et al.

(10) Patent No.: US 12,232,042 B2
(45) Date of Patent: Feb. 18, 2025

(54) USER EQUIPMENT AND SCHEDULING NODE

(71) Applicant: Panasonic Intellectual Property Corporation of America, Torrance, CA (US)

(72) Inventors: Hongchao Li, Langen (DE); Hidetoshi Suzuki, Kanagawa (JP); Quan Kuang, Langen (DE); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 10 days.

(21) Appl. No.: 17/766,178

(22) PCT Filed: Sep. 9, 2020

(86) PCT No.: PCT/EP2020/075131
§ 371 (c)(1),
(2) Date: Apr. 1, 2022

(87) PCT Pub. No.: WO2021/063639
PCT Pub. Date: Apr. 8, 2021

(65) Prior Publication Data
US 2024/0056977 A1 Feb. 15, 2024

(30) Foreign Application Priority Data
Oct. 4, 2019 (EP) .................................... 19201529

(51) Int. Cl.
*H04W 52/02* (2009.01)
(52) U.S. Cl.
CPC ....... *H04W 52/0235* (2013.01); *H04W 52/02* (2013.01)

(58) Field of Classification Search
CPC ......... H04W 52/0216; H04W 52/0229; H04W 52/0235; H04W 52/0241; H04W 52/0245;
(Continued)

(56) References Cited

U.S. PATENT DOCUMENTS

2014/0256386 A1  9/2014  Song et al.
2019/0297577 A1  9/2019  Lin et al.
(Continued)

FOREIGN PATENT DOCUMENTS

EP    2679054 B1   4/2018
RU    2663219 C2   8/2018
(Continued)

OTHER PUBLICATIONS

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019, 99 pages.
(Continued)

*Primary Examiner* — Jean A Gelin
(74) *Attorney, Agent, or Firm* — Seed IP Law Group LLP

(57) ABSTRACT

Provided is a user equipment (UE), a scheduling node, and communication methods for UE and, respectively, scheduling node. The UE comprises a transceiver which, in operation, receives a configuration of a PoSS (power saving signal) time window for monitoring a PoSS and preceding a DRX (discontinuous reception) ON period for monitoring a PDCCH (physical downlink control channel), wherein the PoSS indicates whether or not the UE starts monitoring for the PDCCH in the DRX ON period and circuitry which, in operation, determines, based on the configuration, the PoSS time window, and controls the transceiver to perform monitoring for the PoSS within the PoSS time window.

17 Claims, 8 Drawing Sheets

(58) Field of Classification Search
CPC ..... H04W 52/06; H04W 52/08; H04W 52/10; H04W 68/00; H04W 68/025; H04W 68/005; H04W 72/21; H04W 72/51; H04W 74/0833
See application file for complete search history.

(56) References Cited

U.S. PATENT DOCUMENTS

| | | | |
|---|---|---|---|
| 2020/0092938 A1 | 3/2020 | Tang | |
| 2020/0229092 A1* | 7/2020 | Wu | H04W 76/11 |
| 2021/0368444 A1* | 11/2021 | Wang | H04W 52/0232 |
| 2021/0377852 A1* | 12/2021 | Zhou | H04W 52/0235 |
| 2022/0007290 A1* | 1/2022 | You | H04W 76/28 |
| 2022/0007292 A1* | 1/2022 | Seo | H04W 52/0216 |
| 2022/0104132 A1* | 3/2022 | Wu | H04W 72/23 |
| 2022/0104134 A1* | 3/2022 | Shi | H04W 52/0216 |
| 2022/0174651 A1* | 6/2022 | Seo | H04W 52/0229 |
| 2022/0279442 A1* | 9/2022 | Luo | H04W 76/28 |
| 2022/0377670 A1* | 11/2022 | Xue | H04W 76/28 |
| 2023/0097949 A1* | 3/2023 | He | H04W 68/02 370/318 |
| 2023/0262607 A1* | 8/2023 | Yang | H04W 52/0232 370/318 |
| 2023/0413174 A1* | 12/2023 | Cheng | H04W 72/21 |

FOREIGN PATENT DOCUMENTS

| | | |
|---|---|---|
| WO | WO 2019037127 A1 | 2/2019 |
| WO | WO 2019063819 A1 | 4/2019 |

OTHER PUBLICATIONS

3GPP, "3rd Generation Partnership Project; Technical Specification Group Radio Access Network; NR; Physical channels and modulation (Release 15)," 3GPP TS 38.211 V15.3.0, Sep. 2018, 96 pages.

3GPP, "3rd Generation Partnership Project; Technical Specification Group Radio Access Network; NR; Physical channels and modulation (Release 15)," 3GPP TS 38.211 V15.6.0, Jun. 2019, 97 pages.

3GPP, "3rd Generation Partnership Project; Technical Specification Group Radio Access Network; NR; Physical layer procedures for control (Release 15)," 3GPP TS 38.213 V15.6.0, Jun. 2019, 107 pages.

3GPP, "3rd Generation Partnership Project; Technical Specification Group Services and System Aspects; System Architecture for the 5G System; Stage 2 (Release 16)," 3GPP TS 23.501 V16.1.0, Jun. 2019, 368 pages.

CATT, "Power saving signal/channel design and performance," R1-1908605, Agenda Item: 7.2.9.1, 3GPP TSG RAN WG1 Meeting #98, Prague, CZ, Aug. 26-30, 2019, 19 pages.

CATT, "Study on UE Power Saving in NR," Status Report to TSG, RP-192225, Agenda Item: 9.4.6, 3GPP TSG RAN meeting #85, Newport Beach, USA, Sep. 16-19, 2019, 9 pages.

Extended European Search Report, dated Mar. 27, 2020, for European Application No. 19201529.5-1205, 9 pages.

International Search Report, mailed Dec. 1, 2020, for International Application No. PCT/EP2020/075131, 2 pages.

Panasonic, "Discussion on PDCCH-based power saving signal/channel (PoSS)," R1-1908940, Agenda Item: 7.2.9.1, 3GPP TSG RAN WG1 #98, Prague, CZ, Aug. 26-30, 2019, 10 pages.

Nokia et al., "PDCCH-based power saving signal/channel," R1-1909339, Agenda item: 7.2.9.1, 3GPP TSG RAN WG1 #98, Prague, Czech Republic, Aug. 26-30, 2019. (17 pages).

Notice of Reasons for Rejection, dated Jul. 2, 2024, for Japanese Patent Application No. 2022-520614. (5 pages) (English Translation).

Oppo, "Discussion on PDCCH-based power saving signal/channel," R1-1909218, Agenda Item: 7.2.9.1, 3GPP TSG RAN WG1 #98, Prague, Czech, Aug. 26-30, 2019. (7 pages).

Panasonic, "Discussion on PDCCH-based power saving signal/channel triggering adaptation," R1-1905185, Agenda Item: 7.2.9.1, 3GPP TSG RAN WG1 #96b, Xi'an, China, Apr. 8-12, 2019. (4 pages).

Russian Office Action dated Feb. 8, 2024, for the corresponding Russian Patent Application No. 2022102441/07(005197), 17 pages. (With English Translation).

CATT, "Offline Discussion Summary of PDCCH-based Power Saving Signal/Channel," R1-1909799, Agenda item: 7.2.9.1, 3GPP TSG RAN WG1 Meeting #98, Prague, CZ, Aug. 26-30, 2019. (29 pages).

CATT, "Status Report for WI to TSG: Study on UE Power Saving in NR," RP-191977, Agenda Item: 1.2.3.4, 3GPP TSG RAN meeting #85, Newport Beach, USA, Sep. 16-20, 2019. (9 pages).

Office Action, dated May 8, 2024, for Chinese Patent Application 202080068957.3. (25 pages) (with English Translation).

Vivo, "PDCCH-based power saving signal/channel design," R1-1904103, Agenda Item: 7.2.9.1, 3GPP TSG RAN WG1 #96bis, Xi'an, China, Apr. 8-12, 2019. (7 pages).

* cited by examiner

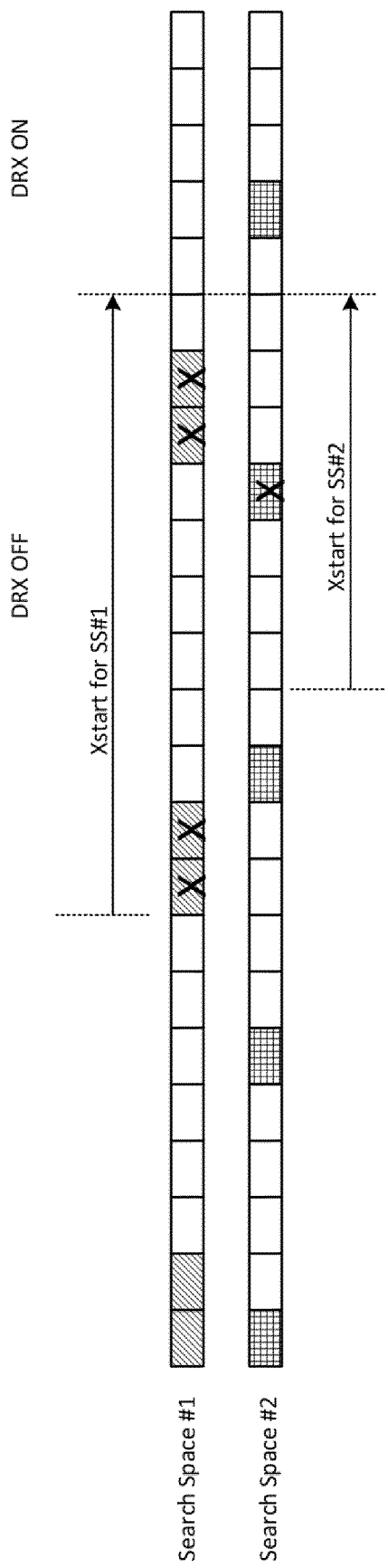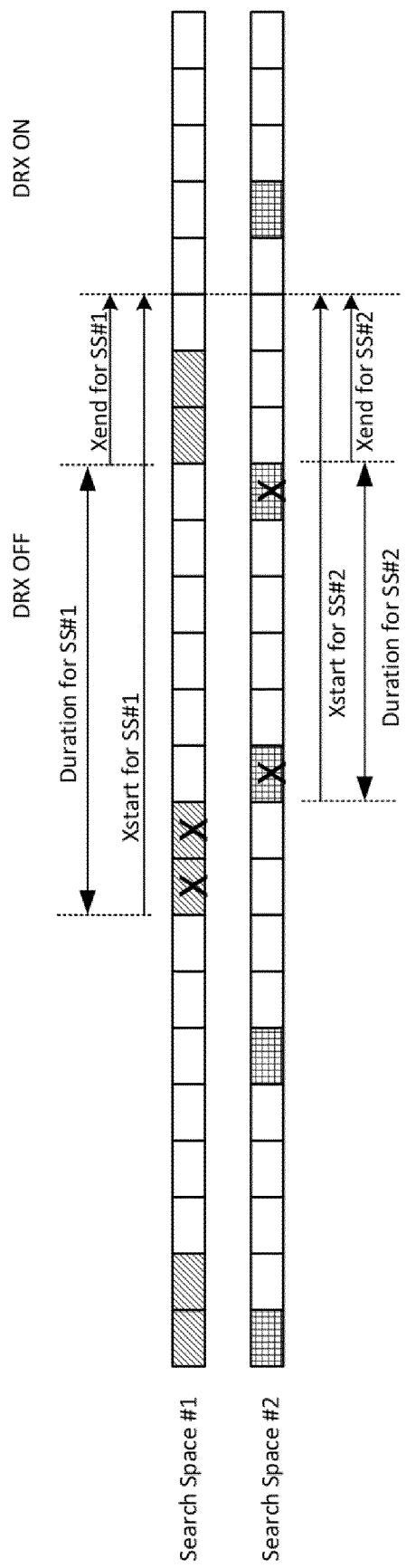

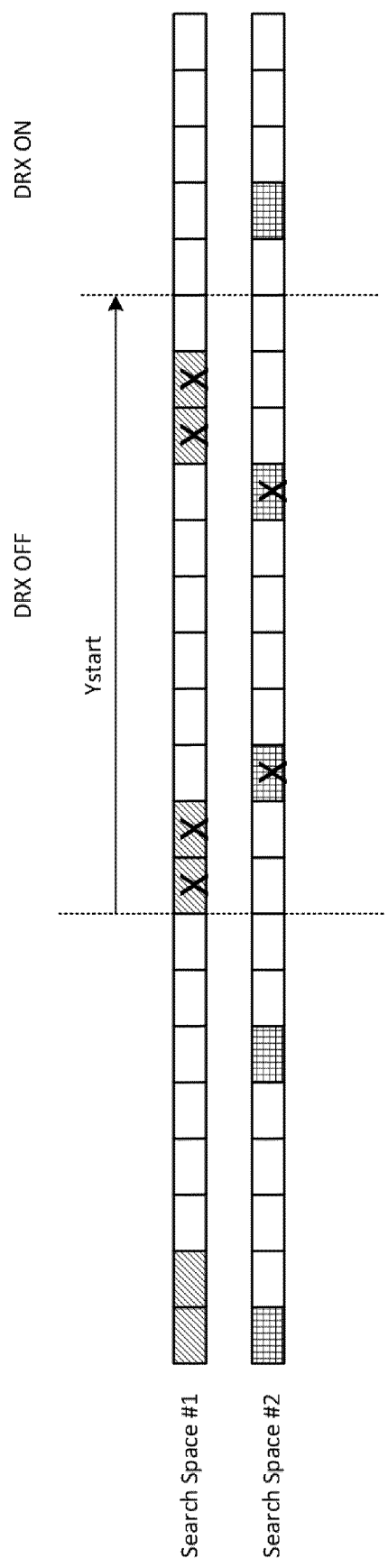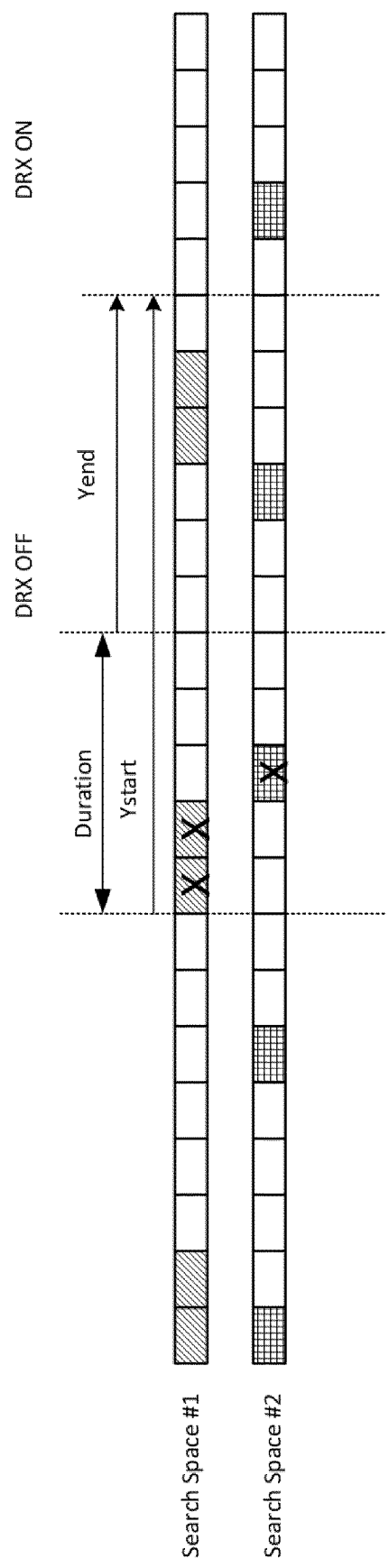

USER EQUIPMENT AND SCHEDULING NODE

BACKGROUND

Technical Field

The present disclosure relates to transmission and reception of signals in a communication system. In particular, the present disclosure relates to methods and apparatuses for such transmission and reception.

Description of the Related Art

The 3rd Generation Partnership Project (3GPP) works at technical specifications for the next generation cellular technology, which is also called fifth generation (5G) including "New Radio" (NR) radio access technology (RAT), which operates in frequency ranges up to 100 GHz. The NR is a follower of the technology represented by Long Term Evolution (LTE) and LTE Advanced (LTE-A).

For systems like LTE, LTE-A, and NR, further modifications and options may facilitate efficient operation of the communication system as well as particular devices pertaining to the system.

BRIEF SUMMARY

One non-limiting and exemplary embodiment facilitates for a user equipment to save power by going to sleep for most parts of a DRX OFF period as well as a flexible allocation of a Power Saving Signal (PoSS) suitable for various scenarios including multi-beam operation and repetition od PoSS.

In an embodiment, the techniques disclosed herein feature a user equipment (UE) comprising a transceiver which, in operation, receives a configuration of a PoSS, power saving signal, time window for monitoring a PoSS and preceding a DRX, discontinuous reception, ON period for monitoring a PDCCH, physical downlink control channel, wherein the PoSS indicates whether or not the UE is allowed to skip monitoring for the PDCCH in the DRX ON period and circuitry which, in operation, determines, based on the configuration, the PoSS time window, and controls the transceiver to perform monitoring for the PoSS within the PoSS time window.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

FIGS. 12 to 15 are diagrams showing PoSS time windows.

DETAILED DESCRIPTION

5G NR System Architecture and Protocol Stacks

3GPP has been working at the next release for the 5$^{th}$ generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
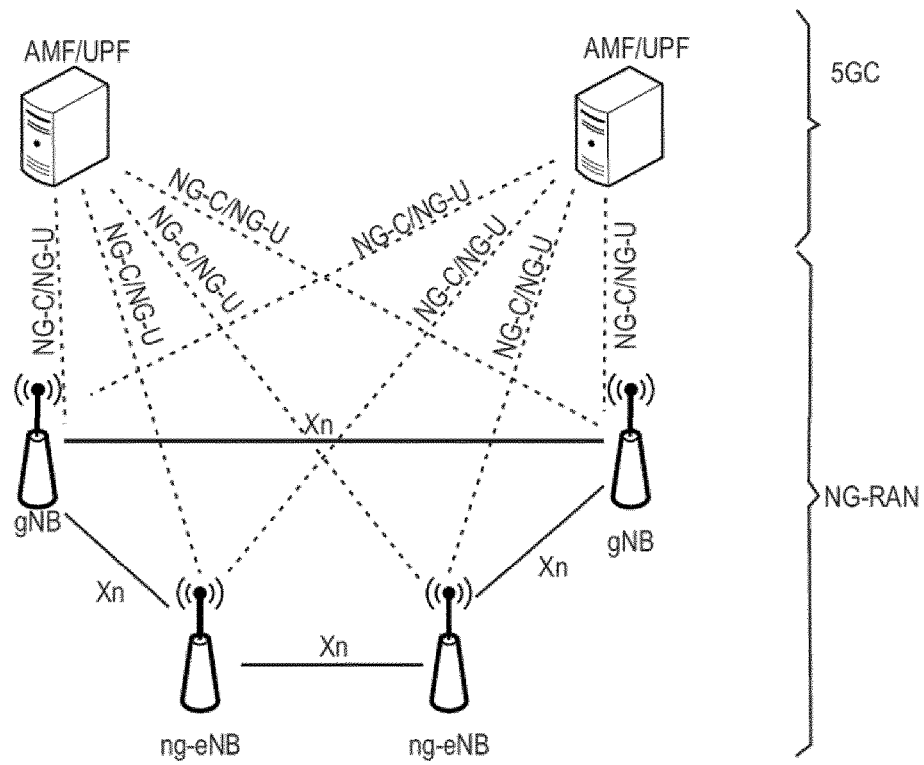
FIG. 1 shows an exemplary architecture for a 3GPP NR system.

Among other things, the overall system architecture assumes an NG-RAN (Next Generation—Radio Access Network) that comprises gNBs (gNodeB), providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.6.0, section 4).

The user plane protocol stack for NR (see, e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH (Physical Uplink Shared Channel) and PUCCH (Physical Uplink Control Channel) for uplink and PDSCH (Physical Downlink Shared Channel), PDCCH (Physical Downlink Control Channel) and PBCH (Physical Broadcast Channel) for downlink.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability ($1\text{-}10^{-5}$ within 1 ms). Finally, mMTC may preferably require high connection density (1,000,000 devices/km² in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f = 1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

5G NR Functional Split Between NG-RAN and 5GC

Figure 2:
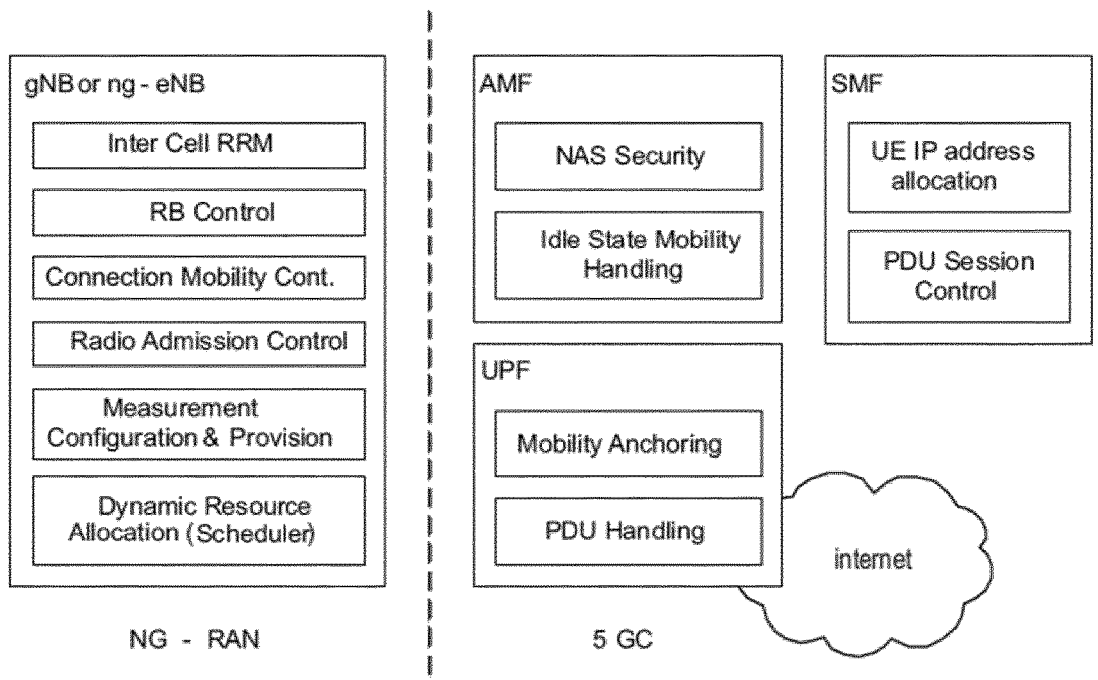
FIG. 2 is a schematic drawing which shows functional split between NG-RAN and 5GC.

FIG. 2 illustrates functional split between NG-RAN and 5GC. NG-RAN logical node is a gNB or ng-eNB. The 5GC has logical nodes AMF, UPF and SMF.

In particular, the gNB and ng-eNB host the following main functions:

Functions for Radio Resource Management such as Radio Bearer Control, Radio Admission Control, Connection Mobility Control, Dynamic allocation of resources to UEs in both uplink and downlink (scheduling);

IP header compression, encryption and integrity protection of data;

Selection of an AMF at UE attachment when no routing to an AMF can be determined from the information provided by the UE;

Routing of User Plane data towards UPF(s);

Routing of Control Plane information towards AMF;

Connection setup and release;

Scheduling and transmission of paging messages;

Scheduling and transmission of system broadcast information (originated from the AMF or OAM);

Measurement and measurement reporting configuration for mobility and scheduling;

Transport level packet marking in the uplink;

Session Management;

Support of Network Slicing;

QoS Flow management and mapping to data radio bearers;

Support of UEs in RRC_INACTIVE state;

Distribution function for NAS messages;

Radio access network sharing;

Dual Connectivity;

Tight interworking between NR and E-UTRA.

The Access and Mobility Management Function (AMF) hosts the following main functions:

Non-Access Stratum, NAS, signalling termination;

NAS signalling security;

Access Stratum, AS, Security control;

Inter Core Network, CN, node signalling for mobility between 3GPP access networks;

Idle mode UE Reachability (including control and execution of paging retransmission);

Registration Area management;

Support of intra-system and inter-system mobility;

Access Authentication;

Access Authorization including check of roaming rights;

Mobility management control (subscription and policies);

Support of Network Slicing;

Session Management Function, SMF, selection.

Furthermore, the User Plane Function, UPF, hosts the following main functions:

Anchor point for Intra-/Inter-RAT mobility (when applicable);

External PDU session point of interconnect to Data Network;

Packet routing & forwarding;

Packet inspection and User plane part of Policy rule enforcement;

Traffic usage reporting;

Uplink classifier to support routing traffic flows to a data network;

Branching point to support multi-homed PDU session;

QoS handling for user plane, e.g., packet filtering, gating, UL/DL rate enforcement;

Uplink Traffic verification (SDF to QoS flow mapping);

Downlink packet buffering and downlink data notification triggering.

Finally, the Session Management function, SMF, hosts the following main functions:
Session Management;
UE IP address allocation and management;
Selection and control of UP function;
Configures traffic steering at User Plane Function, UPF, to route traffic to proper destination;
Control part of policy enforcement and QoS;
Downlink Data Notification.

RRC Connection Setup and Reconfiguration Procedures

Figure 3:
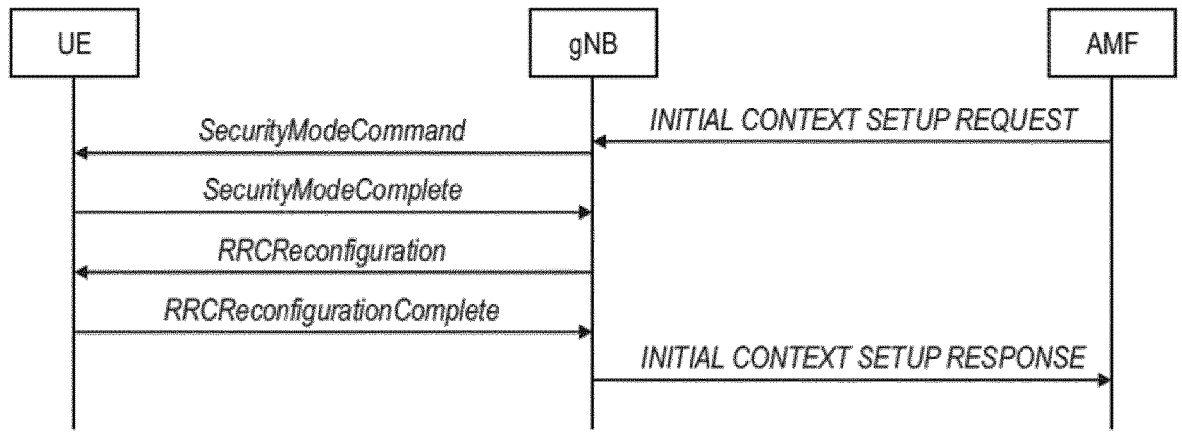
FIG. 3 is a sequence diagram for RRC connection setup/reconfiguration procedures.

FIG. 3 illustrates some interactions between a UE, gNB, and AMF (an 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. In particular, this transition involves that the AMF prepares the UE context data (including, e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

Figure 4:
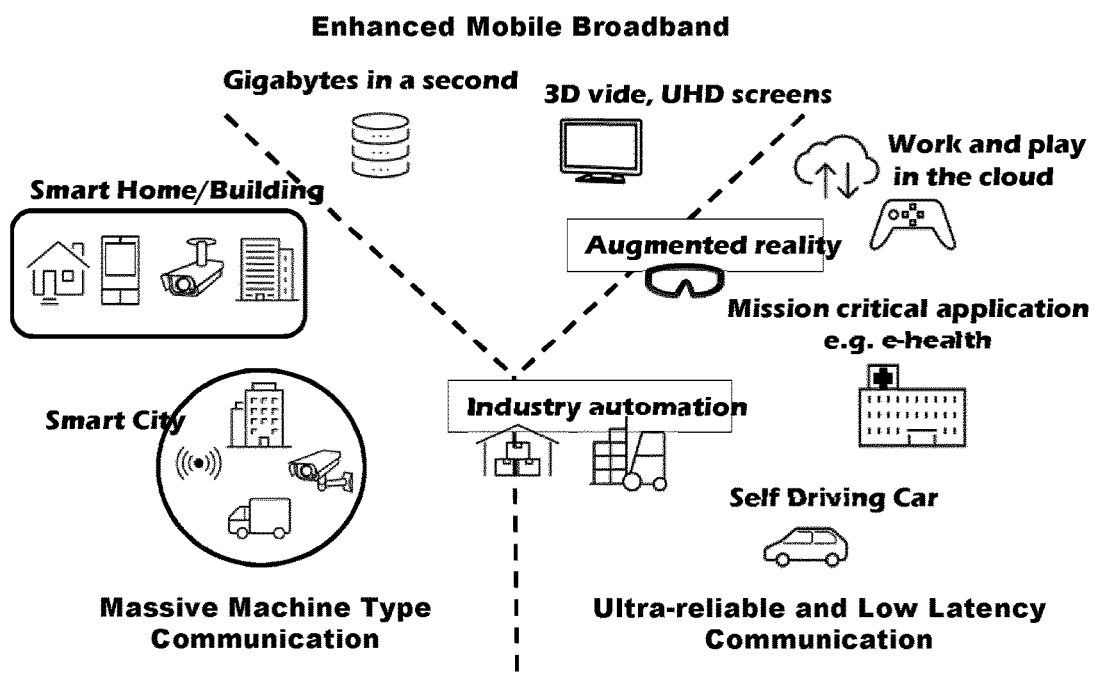
FIG. 4 is a schematic drawing showing usage scenarios of Enhanced mobile broadband (eMBB), Massive Machine Type Communications (mMTC) and Ultra Reliable and Low Latency Communications (URLLC)

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see, e.g., FIG. 2 of ITU-R M.2083).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI (Downlink Control Information) formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to $10^{-6}$ level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLLC, several technology enhancements from the physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

In slot-based scheduling or assignment, a slot corresponds to the timing granularity (TTI—transmission time interval) for scheduling assignment. In general, TTI determines the timing granularity for scheduling assignment. One TTI is the time interval in which given signals is mapped to the physical layer. For instance, conventionally, the TTI length can vary from 14-symbols (slot-based scheduling) to 2-symbols (non-slot based scheduling). Downlink (DL) and uplink (UL) transmissions are specified to be organized into frames (10 ms duration) consisting of 10 subframes (1 ms duration). In slot-based transmission, a subframe is further divided into slots, the number of slots being defined by the numerology/ subcarrier spacing. The specified values range between 10 slots per frame (1 slot per subframe) for a subcarrier spacing of 15 kHz to 80 slots per frame (8 slots per subframe) for a subcarrier spacing of 120 kHz. The number of OFDM symbols per slot is 14 for normal cyclic prefix and 12 for extended cyclic prefix (see section 4.1 (general frame structure), 4.2 (Numerologies), 4.3.1 (frames and subframes) and 4.3.2 (slots) of the 3GPP TS 38.211 V15.3.0, Physical channels and modulation, 2018-09). However, assignment of time resources for transmission may also be non-slot based. In particular, the TTIs in non slot-based assignment may correspond to mini-slots rather than slots, i.e., one or more mini-slots may be assign to a requested transmission of data/control signaling. In non slot-based assignment, the minimum length of a TTI may for instance be 1 or 2 OFDM symbols.

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g., as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
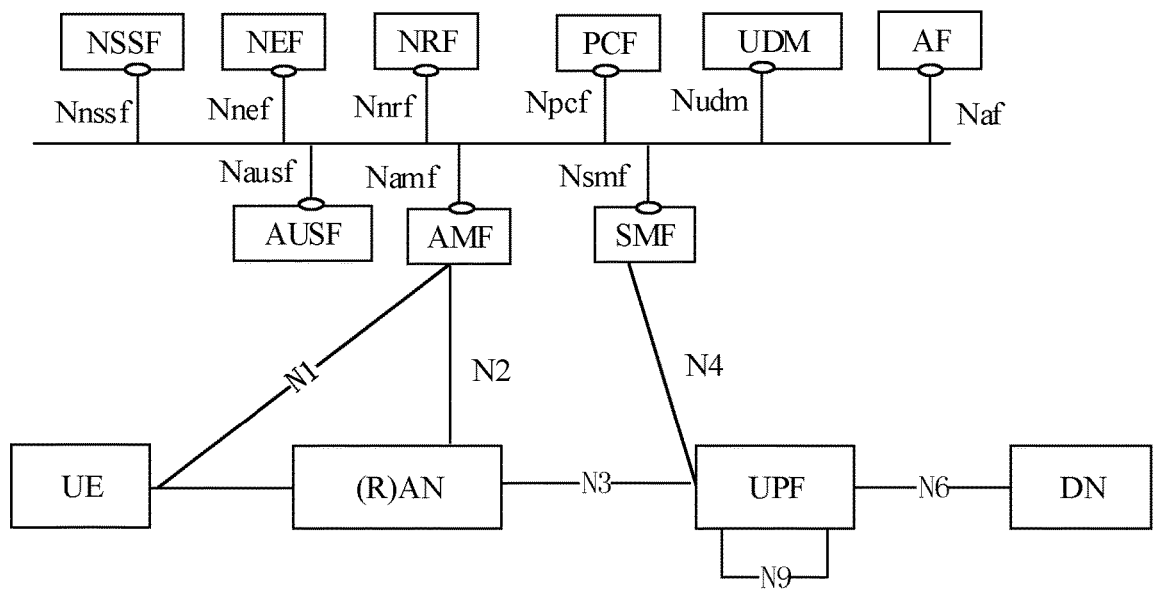
FIG. 5 is a block diagram showing an exemplary 5G system architecture for a non-roaming scenario.

FIG. 5 illustrates a 5G NR non-roaming reference architecture (see TS 23.501 v16.1.0, section 4.23). An Application Function (AF), e.g., an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services. All of or a part of the core network functions and the application services may be deployed and running on cloud computing environments.

In the present disclosure, thus, an application server (for example, AF of the 5G architecture), is provided that comprises a transmitter, which, in operation, transmits a request containing a QoS requirement for at least one of URLLC, eMMB and mMTC services to at least one of functions (for example NEF, AMF, SMF, PCF, UPF, etc.) of the 5GC to establish a PDU session including a radio bearer between a gNodeB and a UE in accordance with the QoS requirement and control circuitry, which, in operation, performs the services using the established PDU session.

In wireless communication systems such as LTE and NR, efficiency of power utilization is increased by applying Discontinuous Reception (DRX). The DRX is a way to shorten the active period in RRC_CONNECTED mode without scheduling grant. In particular, by means of timers, which may be configured by an eNB or gNB, the UE is capable of operating in an active mode (or DRX ON state) in which it monitors PDCCH, and in a DRX OFF state or mode, in which the reception is switched off.

Accordingly, the DRX mechanism provides ON durations (in which a PDCCH is monitored) and OFF durations (in which no PDCCH is monitored). The starting time and duration of the ON time (and thus also OFF time) is configured by the RRC, which means that it is not dynamic, but at most semi-static. Dynamic change means change with scheduling frequency, e.g., with the scheduling grants. Semi-static may still mean change during communication connection, e.g., by the RRC, but RRC configurations are less frequent than scheduling grants. Since in DRX, PDCCH cannot in general be monitored during the OFF durations, service latency may be increased, which may be less effective for some particular, delay-sensitive services. In other words, since in OFF mode, the UE does not monitor PDCCH, if traffic arrives, the UE cannot be scheduled until the next ON duration. Consequently, low latency requirements may not be guaranteed for some services. However, it should be noted that even when DRX is applied, a UE may still monitor for certain kinds of signal or PDCCH, such as common PDCCH or paging, during the DRX OFF period. However, UE-specific PDCCHs need not be monitored during the DRX off period.

If the DRX ON duration periodicity is configured with a short value, the power consumption will increase due to the increased monitoring of the PDCCH. Even in case in which there is no traffic at all, the UE still needs to turn on to monitor PDCCH, which result in wasting of power. On the contrary, DRX may lead to long waiting time when traffic arrives and unnecessary power wasting when no traffic arrives.

To improve the power saving capabilities, a Power Saving Signal (PoSS) may be used in addition to and in combination with DRX. For instance, the Power Saving Signal is DCI based: it may be included in special DCI for which monitoring is performed in the DRX OFF period. In particular, if a UE receives a PoSS prior to the start of a DRX On period, the PoSS may indicate to the UE whether it needs to perform monitoring during the next PDCCH, or whether it can remain in OFF state (or "in sleep") during the next DRX On period.

For example, the PoSS saving signal is monitored outside active time (or DRX ON period) with an offset before DRX ON. Intentions of such a configuration include that the PoSS need not be monitored during DRX ON. Moreover, it is assumed in this example a single monitoring occasion (e.g., the PoSS being monitored only in a single slot).

However, support for multiple monitoring occasions in order to provide a better PoSS reception reliability and support of beam forming/sweeping operation, multiple monitoring occasions may supported by a working assumption that more than one monitoring occasion can be configured within a slot or multiple slots before the DRX ON.

The following two alternatives may be used to specify the PoSS monitoring occasion(s):

Alternative 1: A dedicated configuration with an offset relative to the beginning of DRX ON is provided. This corresponds to a single location for the monitoring occasion with a configured offset relative to the beginning of DRX ON.

Alternative 2: The Offset is based on search space configuration. This alternative proposes to use associate a generic search space configuration with DRX and no new signaling otherwise.

Figure 6:
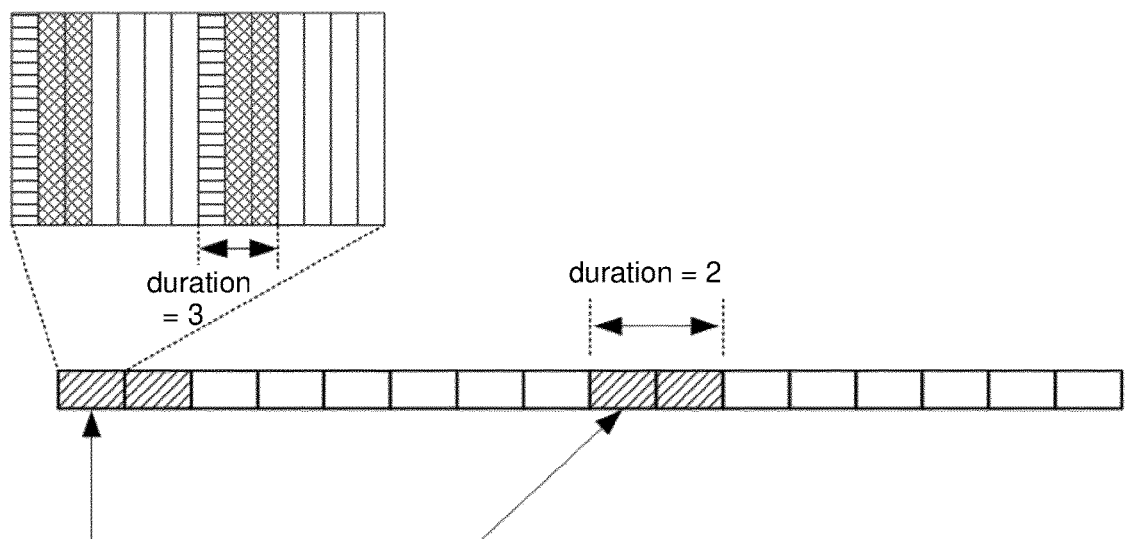
FIG. 6 is an illustration of a configuration of a search space for a PDCCH.

In the NR specification of a generic search space configuration, the PDCCH monitoring occasions are controlled by the parameters from the IE (information element) SearchSpace and ControlResourceSet in the RRC signalling, as is shown in FIG. 6. Basically, the monitoringSlotPeriodicityAndOffset and duration in SearchSpace decide on the slots where the PDCCH is monitored. Then, the bitmap monitoringSymbolsWithinSlot in SearchSpace and duration in ControlResourceSet determine the PDCCH monitoring pattern (e.g., the starting symbol and the number of symbols) of the search space within a slot.

In general, a monitoring occasion, corresponds to a configured time and frequency domain resource in several consecutive symbols within a slot. The monitoring occasion is defined in the TS38.213 V15.6.0, Section 10.1:

A UE determines a PDCCH monitoring occasion on an active DL BWP from the PDCCH monitoring periodicity, the PDCCH monitoring offset, and the PDCCH monitoring pattern within a slot. For search space set s, the UE determines that a PDCCH monitoring occasion(s) exists in a slot with number $n_{s,f}^\mu$ [4, TS 38.211] in a frame with number $n_f$ if $(n_f N_{slot}^{frame,\mu} + n_{s,f}^\mu - o_s) \bmod k_s = 0$ $(n_f Name_{slot}^{frame,\mu} + n_{s,f}^\mu - o_{p,s}) \bmod k_{p,s} = 0$. The UE monitors PDCCH candidates for search space set s for $T_s$ consecutive slots, starting from slot $n_{s,f}^\mu$, and does not monitor PDCCH candidates for search space set s for the next $k_s - T_s$ consecutive slots.

This definition of monitoring occasion is applicable to monitoring a PDCCH for a DCI. It can particularly be applied to the PoSS monitoring occasions for monitoring a DCI-based PoSS which is included in a specific DCI and monitored outside the DRX ON period.

As described above, PoSS monitoring occasions are configured before a DRX ON period. The DRX configuration also utilizes the periodicity and offset formalism shown in FIG. 6.

However, when looking at the RRC configurations of drx-LongCycleStartOffset shown below, the supported periodicity and offset options are not aligned with that of monitorinrgSlotPerodicityAndOffset in SearchSpace shown further below:

RRC Configuration of drx-LongCycleStartOffset:

| drx-LongCycleStartOffset | CHOICE { |
|---|---|
| ms10 | INTEGER(0..9), |
| ms20 | INTEGER(0..19), |
| ms32 | INTEGER(0..31), |
| ms40 | INTEGER(0..39), |
| ms60 | INTEGER(0..59) |
| ms64 | INTEGER(0..63), |
| ms70 | INTEGER(0..69), |
| ms80 | INTEGER(0..79), |
| ms128 | INTEGER(0..127), |
| ms160 | INTEGER(0..159), |
| ms256 | INTEGER(0..255), |
| ms320 | INTEGER(0..319), |
| ms512 | INTEGER(0..511), |
| ms640 | INTEGER(0..639), |
| ms1024 | INTEGER(0..1023) |
| ms1280 | INTEGER(0..1279), |
| ms2048 | INTEGER(0..2047), |
| ms2560 | INTEGER(0..2559), |
| ms5120 | INTEGER(0..5119) |
| ms10240 | INTEGER(0..10239) |
| } | |

RRC Configuration of monitoringSlotPerodicityAndOffset:

| monitoringSlotPeriodicityAndOffset | CHOICE { |
|---|---|
| Sl1 | NULL, |
| sl2 | INTEGER (0..1), |
| sl4 | INTEGER (0..3). |
| sl5 | INTEGER (0..4), |
| sl8 | INTEGER (0..7), |
| sl10 | INTEGER (0..9), |
| sl16 | INTEGER (0..15), |
| sl20 | INTEGER (0..19), |
| sl40 | INTEGER (0..39), |
| sl80 | INTEGER (0..79), |
| sl160 | INTEGER (0..159), |
| sl320 | INTEGER (0..319), |
| sl640 | INTEGER (0..639), |
| sl1280 | INTEGER (0..1279), |
| sl2560 | INTEGER (0..2559) |

Thus, if the PoSS search space, when following the above search space configuration, is directly associated with a DRX configuration, the misaligned periodicities of the above configurations may cause the PoSS monitoring occasions to be spread widely in the DRX OFF period. This may make it more difficult for the UE to save power by going to sleep for most parts of DRX OFF durations and start to monitor PoSS few slots before the DRX ON. This may be an obstacle in directly reusing the above-described Search Space IE by the PoSS search space configuration and associating it to the DRX configuration.

Moreover, the DRX configuration is more UE specific as it considers the UE traffic pattern, base station scheduling strategy and time domain load spreading due to control/data physical resource shortage. Although PoSS monitoring occasions are also UE specifically configured, group-based operation is supported for wake-up triggering. Therefore, one monitoring occasion with fixed offset value before the DRX ON is restrictive for wake-up triggering.

In addition, the above described specification may not be sufficient to support enhancement by configuring multiple monitoring occasions for repetition or beamforming operation.

The present disclosure provides techniques for power saving signal monitoring. In particular, to specify accurate, well-positioned, and sufficient monitoring occasions for the DCI-based PoSS and clear UE behavior in the standard, it is proposed to configure a monitoring window or duration and to define corresponding UE behavior for monitoring the PoSS.

In this disclosure, UEs and scheduling nodes such as base stations and corresponding methods are described for the new radio access technology envisioned for the 5G mobile communication systems such as 3GPP NR, but which may also be used in LTE mobile communication systems.

Accordingly, a communication apparatus (or user terminal or communication terminal) is referred to as UE (user equipment), and a scheduling node such as a base station may correspond to a gNodeB (gnN).

Moreover, some of the terms of the procedures, entities, layers, etc., used in the following are closely related to LTE/LTE-A systems or to terminology used in the current 3GPP 5G standardization, even though specific terminology to be used in the context of the new radio (NR) access technology for the next 3GPP 5G communication systems is not fully decided yet or might finally change. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology.

A communication apparatus or device, such as a UE, and a scheduling node may comprise a transceiver and circuitry such as processing circuitry. The transceiver in turn may comprise and/or function as a receiver and a transmitter. The processing circuitry may be one or more pieces of hardware such as one or more processors or any LSIs (Large Scale integration). Between the transceiver and the processing circuitry there is an input/output point (or node) over which the processing circuitry, when in operation, can control the transceiver, i.e., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data, which is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto, such as monitoring a channel.

Figure 7:
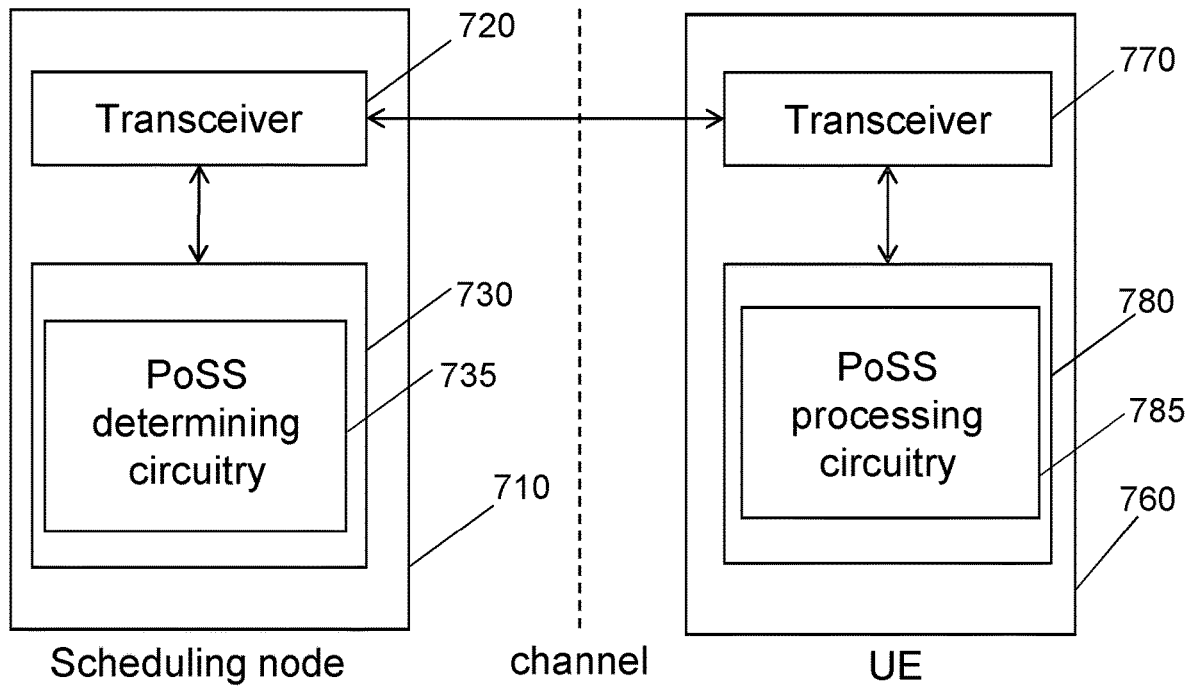
FIG. 7 is a block diagram of a scheduling node and a user equipment (UE)

Provided are a user equipment (UE) 760 and a scheduling node 710, which are shown in FIG. 7. The UE 760 and the scheduling node, which may be a gNB of 3GPP NR, communicate over a wireless channel in a wireless communication system.

The UE comprises a transceiver 770 (or "UE transceiver") and circuitry 780 ("UE circuitry"), such as processing circuitry.

The transceiver, in operation, receives a configuration of a PoSS (power saving signal) time window. The PoSS time window is a time interval for monitoring a PoSS, and this time window precedes a DRX ON interval for monitoring a PDCCH. The PoSS indicates whether or not the UE is allowed to skip monitoring for the PDCCH in the DRX ON period.

The UE circuitry 780, in operation, determines, based on the received configuration, the PoSS time window, and controls the transceiver to perform monitoring for the PoSS within the PoSS time window.

The UE transceiver, 770 performs monitoring for the PoSS in accordance with the control by the UE circuitry 770, and may further be controlled by the UE circuitry 780 to perform monitoring for the PDCCH in the next DRX ON period following the PoSS time window in accordance with an indication included in the PoSS.

For instance, if the PoSS indicates that the UE 760 is allowed to skip (or omit) monitoring for the PDCCH in the DRX ON period, the UE circuitry 780, in operation, controls the UE transceiver 770 to skip monitoring for the PDCCH in the DRX ON period. Accordingly, the UE does not monitor for the PDCCH in the DRX ON period. On the other hand, if the PoSS indicates that the UE 760 is not allowed to skip monitoring for the PDCCH in the DRX ON period, the UE circuitry 780 controls the UE transceiver 770 to monitor for the PDCCH in the DRX ON period.

Figure 8:
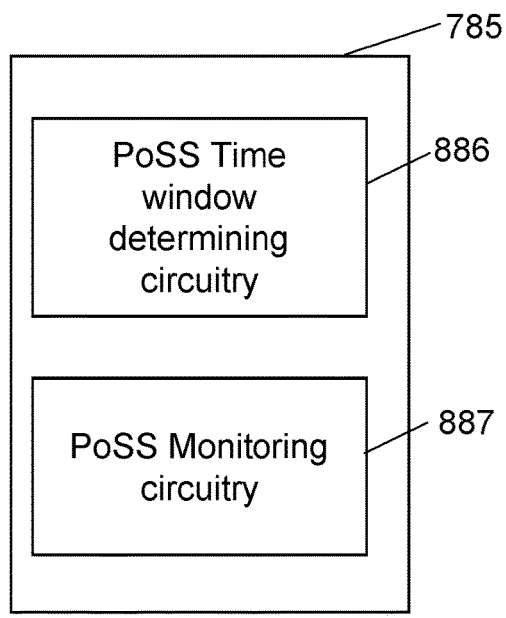
FIG. 8 is a block diagram of a UE's PoSS (Power Saving Signal) processing circuitry.

As can be seen from FIG. 7, the UE circuitry 780 may comprise PoSS processing circuitry 785, which is shown in FIG. 8. For instance, the PoSS processing circuitry comprises PoSS time window determining circuitry 886 and PoSS monitoring circuitry 887.

The scheduling node comprises circuitry 730, or "scheduling node circuitry," and a transceiver 720, or "scheduling node transceiver."

The scheduling node circuitry 730, in operation, determines a configuration of a PoSS time window for a UE to monitor a PoSS. The PoSS time window precedes a DRX ON period for monitoring a PDCCH, and the PoSS indicates whether skipping of monitoring PDCCH in the DRX is allowed for the UE.

The scheduling node transceiver 720, in operation, transmits the configuration of the PoSS time window, and transmits the PoSS within a time window.

For instance, the scheduling node 710 performs transmission of the PDCCH in the DRX ON period in accordance with the indication by the PoSS. Accordingly, the scheduling node transceiver 720, in operation, transmits the PDCCH if the PoSS does not indicate skipping monitoring, and skips (or omits) the transmission of the PDCCH if the PoSS indicates that the UE may skip monitoring for it in the DRX ON period.

Figure 9:
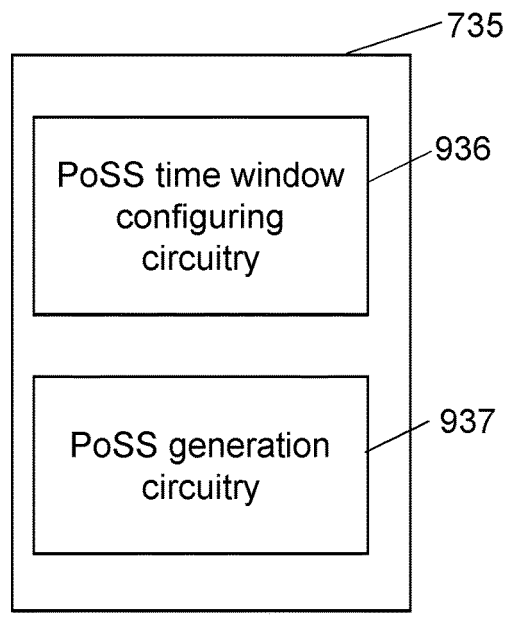
FIG. 9 is a block diagram of a scheduling node's PoSS determining circuitry.

As shown in FIG. 7, the scheduling node circuitry 730 may comprise PoSS determining circuitry 735. As is further shown in FIG. 9, PoSS determining circuitry 735 may comprise PoSS time window configuring circuitry 936 and PoSS generation circuitry 937.

Figure 10:
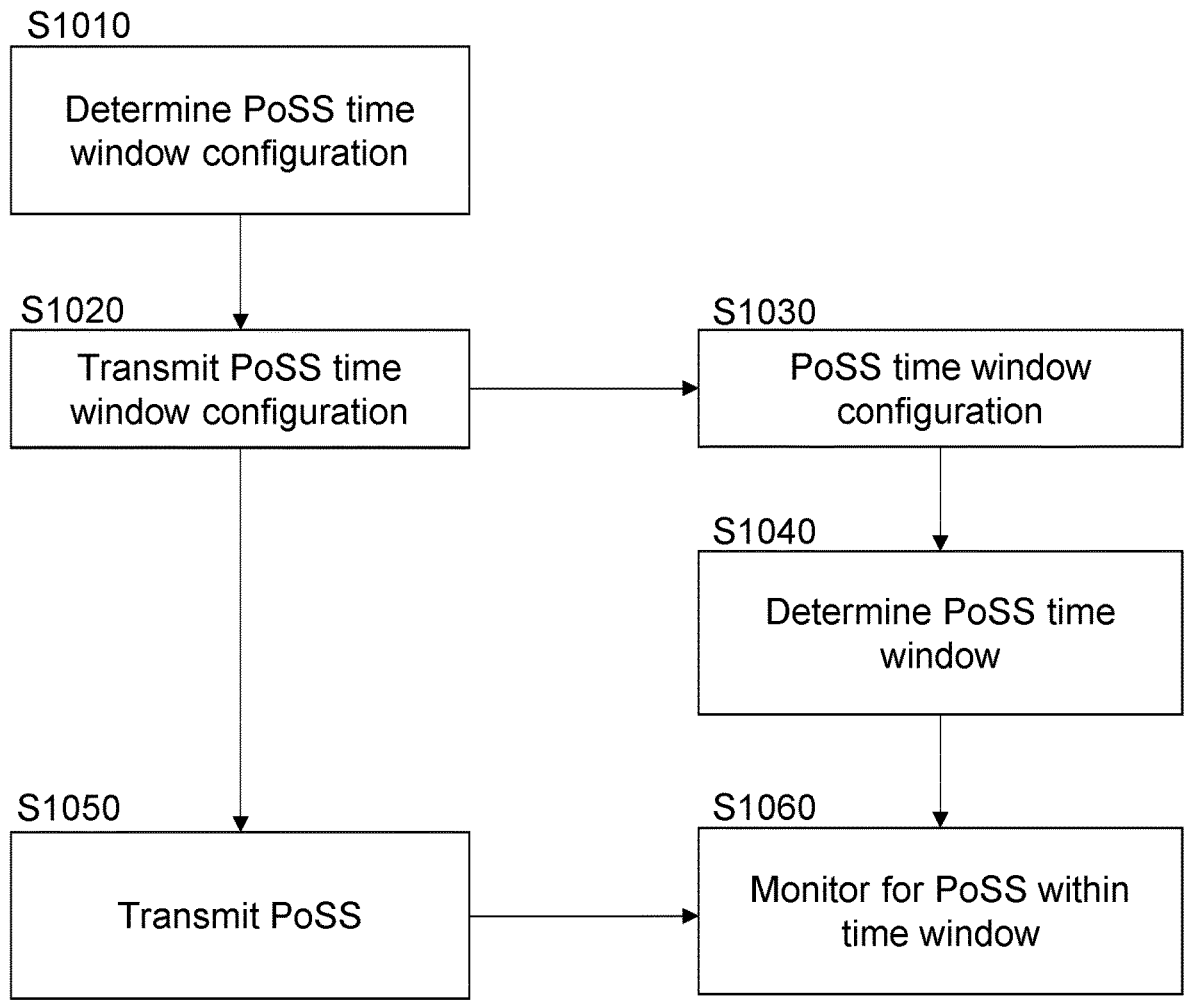
FIG. 10 is a flow chart of a communication method steps performed by a scheduling node and a UE.

In correspondence with the above apparatuses, the application provides a communication method to be performed by a UE 760 and a communication method to be performed by a scheduling node 710. Steps of the communication methods performed by the UE 760 and the scheduling node 710 are shown in FIG. 10.

In step S1010, the scheduling node 1010 determines a configuration of a PoSS time window in which monitoring for a PoSS is to be performed by UE 760. The PoSS time window precedes a DRX ON period, and the PoSS indicates whether or not monitoring for a PDCCH is to be performed by the UE in the DRX ON period. In step S1020, the scheduling node 710 transmits the configuration of the PoSS time window to the UE 760, which in step S1030 receives the configuration from the scheduling node. In step S1040, the UE 760 determines the PoSS time window based on the configuration. Moreover, the scheduling node 710 in step S1050 transmits the PoSS to the UE 760, and the UE 760 in step S1060 monitors for the PoSS time window within the configured time window.

Moreover, in the DRX ON window, the scheduling node may perform transmission of a PDCCH, e.g., transmit the PDCCH or skip transmission of the PDCCH, in accordance with the PoSS signal, and the UE monitors or skips monitoring for the PDCCH accordingly.

Figure 11:
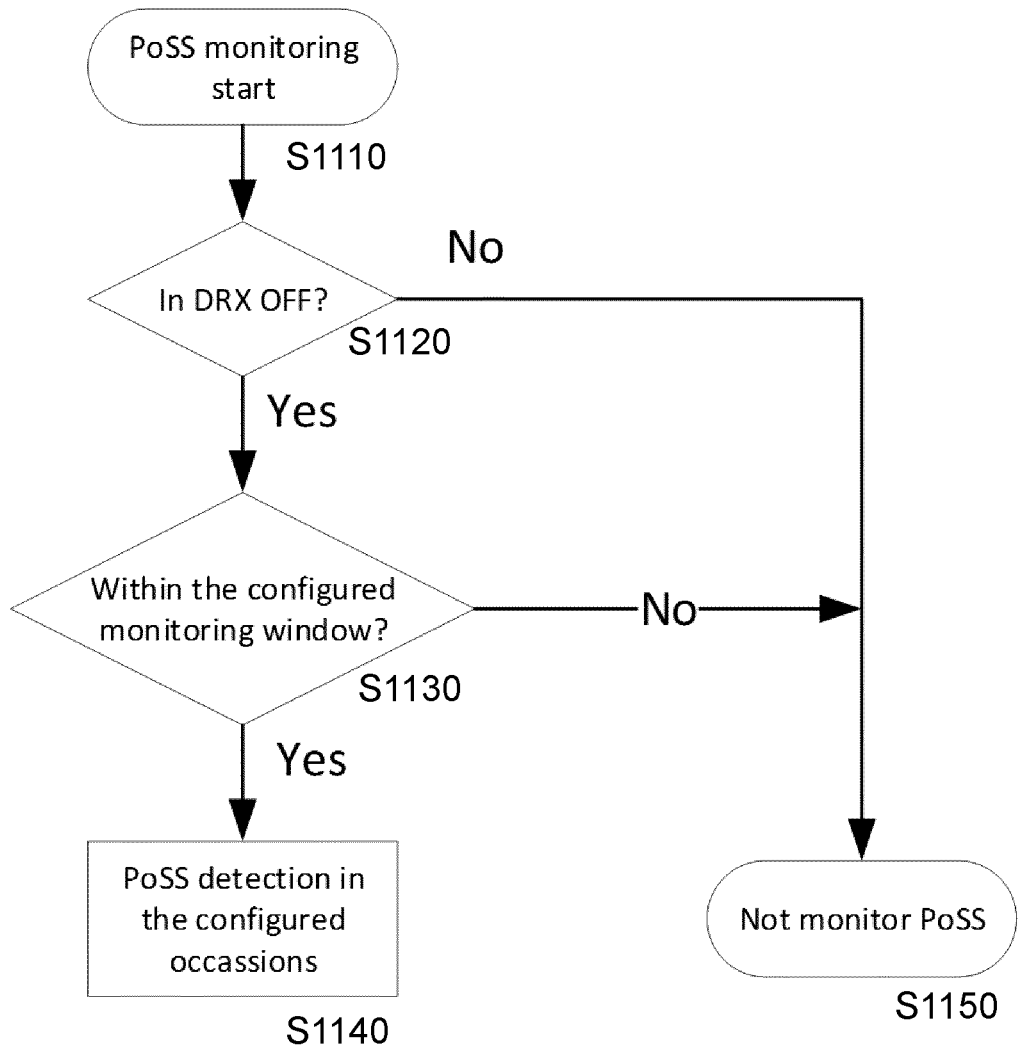
FIG. 11 is a flow chart of a communication method for a UE.

Regarding the UE, exemplary steps and decisions in the monitoring for the PoSS are shown in FIG. 11. The PoSS monitoring, including determining or deciding whether the monitoring is to be performed, starts in step S1110. In step S1120, the UE checks or determines whether it is in DRX OFF state or whether a current time instance is within a DRX OFF period. If no, such as in a DRX ON period, PoSS may not be monitored, S1150. If yes, the UE checks whether the current time instance is within the configured PoSS monitoring window, S1130. If the current time instance is not within the PoSS monitoring window, the PoSS is not monitored (S1150). If the current time instance is within the configured monitoring window, the PoSS is monitored for, S1140.

For instance, the PoSS is located in a monitoring occasion within a search space which is configured in accordance with the above description of FIG. 6. Accordingly, a periodicity and duration regarding the slots, and the symbols within the slots, may be determined by the search space configuration. However, if, in accordance with the present disclosure, a PoSS monitoring window is configured, only monitoring occasions of the search space that are located within the window need to be monitored. Accordingly, the UE may sleep or need not perform any monitoring for the PoSS outside the PoSS monitoring window.

There may be one or more configured search spaces. For instance, a UE may be configured with one or more search spaces comprising monitoring occasions for monitoring the PoSS. For instance, in multi-beam operation, each search space may be associated with one beam among a plurality of beams. The UE transceiver, 770, is controlled by the UE circuitry 780 to monitor, and performs monitoring for the PoSS on the monitoring occasions that fall within the PoSS time window.

Accordingly, the PoSS time window may be included in a plurality of PoSS time windows. Each of the time windows is configured for a search space out of a plurality of search spaces, and each of the plurality of search spaces is associated with one of a plurality of beams. The scheduling node transceiver, 720, in operation, transmits each of a plurality of PoSS including said PoSS on a respective one of the plurality of beams within the respectively configured PoSS time window in accordance with the associated search space.

In addition to beamforming operation, the provision of a PoSS time window also allows for transmitting repetitions of the power saving signal. Monitoring and receiving of a PoSS and its repetition may provide power saving gains for the UE 660. Accordingly, in some embodiments, the scheduling node transceiver 720, in operation transmits a repetition of the PoSS within the PoSS time window.

In the configuration, the PoSS time window, e.g., the start, the end, or the length of the time window, may be indicated in units of slots, e.g., as a number of slots.

On the other hand, the PoSS monitoring window may also be indicated as a number of monitoring occasions, such as configured monitoring occasions included in a configured search space. For instance, using a search space configuration as shown in FIG. 6, the number of monitoring occasions may correspond to a number of monitoring symbols (such as "1" bits in the bitmap monitoringSymbolsWithinSlot multiplied by a duration in symbols corresponding to duration in a SeachSpace IE) times a number of monitoring slots included in the window, as indicated by monitoringSlotPeriodicity and Offset and duration in ControlResourceSet. Alternatively, regarding the number of monitoring symbols, only the "1" bits in monitoringSymbolsWithinSlot, corresponding to starting symbols for monitoring, may be counted without multiplying them with the duration in symbols.

The configuration of the PoSS may be transmitted and received by means of RRC signaling.

In this disclosure, any embodiments are to be understood to describe and be applicable to each of UE 760, scheduling node 710 as well as the corresponding communication methods.

For instance, the configuration of the PoSS time window may comprise an offset, which indicates a start of the PoSS time window. The offset is an offset relative to the start of the DRX ON period.

For instance, the offset may indicate a number of slots, or a time distance in units of slots, or a number of monitoring occasions between the beginning of the PoSS monitoring window and the beginning of the DRX ON period, or a number of slots or configured monitoring occasions before the DRX ON period at which the PoSS monitoring window begins.

Regarding the end of the PoSS time window, in some embodiments, the PoSS time window ends at the start of the DRX ON period. Accordingly, last slot of the PoSS monitoring window or PoSS time window is the last slot before the beginning of the DRX ON period, which is adjacent to a first slot in time included in the DRX ON period. Likewise, a last monitoring occasion may be a last monitoring occasion included in a search space before the start of the DRX ON period.

However, in some embodiments, the configuration of the PoSS time window may include a first offset (e.g., in units of slots or monitoring occasions) indicating the start of the PoSS time window and a second offset (e.g., in units of slots or monitoring occasions) indicating an end of the PoSS time window relative to the start of the DRX ON period (or with respect to the start of the DRX ON period). Alternatively, the second offset may indicate a duration of the PoSS time window (number of slots or monitoring occasions) starting from the start of the PoSS time window.

Accordingly, according to the present disclosure, the monitoring occasions for the PoSS are determined by a window or duration. As will be described further, in some embodiments the PoSS time window may for instance be specific either to a search space. Thus, the PoSS time window or monitoring duration may be determined by the search space configuration and one offset Xstart or a two offsets, first offset Xstart and second offset Xend, configured for each search space.

However, in some embodiments, the configuration of the PoSS time window is specific to a DRX configuration. Accordingly, the windor or duration for monitoring the PoSS may be determined by one offset Ystart, or a first offset Ystart and a second offset Yend associated with the DRX configuration.

Search Space Specific PoSS Time Window Configuration

Examples of search space specific PoSS time window configurations are shown for two search spaces, search space 1 and search space 2, in FIG. 12. The PoSS time window or PoSS monitoring window is defined for each search space by a respective parameter Xstart, which indicates the offset of the start of the PoSS time window. A parameter Xstart is configured respectively for each search space set for PoSS monitoring respectively. In the FIG. 12 as well as the consecutive Figures FIGS. 13 to 15, arrays of slots are shown, and the search spaces are shown as hatched slots. Moreover, the "X" markings indicate slots in the search space which are within the PoSS monitoring window.

If the UE 760 is in DRX OFF state, the UE shall monitor for the PoSS in the monitoring occasions of all configured or valid search spaces that fall within the PoSS time window spanning from the respective slots indicated by the Xstart parameters before the next closest subsequent DRX ON period or duration until the starting of the DRX on duration. As mentioned above, the parameter(s) Xstart can be indicated in terms of number of slots or number of monitoring occasions.

In some embodiments, monitoring occasions for the PoSS that fall within the DRX on period may be skipped by the UE, as they do not fall within the PoSS monitoring window.

The parameter Xstart (or parameters Xstart) may be added in an IE Search Space, which is configured with a PS-RNTI (power saving RNTI, Radio Network Temporary Identifier). For instance, the PS-RNTI is a UE-specific RNTI. Alternatively, each parameter Xstart (or Xoffset) can also be configured separately with the respective search space, wherein the search spaces are configured with multiple RNTIs, e.g., a RNTI for each search space.

A variation of the search space specific PoSS time window configuration is shown in FIG. 13. In particular, instead of using one value, to define the monitoring window or duration, two values may be configured for each search space.

Thus, the configuration of a PoSS time window for a search space can be a parameter pair {X start, Xend} or a parameter pair {Xstart, duration or Xduration}. For both options of parameter pairs, the two parameters may be indicated in terms or units of numbers of slots or numbers of monitoring occasions. As a further alternative, a parameter pair {Xend, duration} may be configured.

Similarly to FIG. 12, also in the case of two parameters per search space, the monitoring occasions will apply and will be monitored by the UE 660 that fall within the monitoring window relative to the next consecutive DRX ON duration or period.

The provision of a second parameter, either a second offset Yend indicating 1 the end of the PoSS window or an indicator of the window length or duration, allows for providing a gap between the end of the PoSS time window and the DRX on period. Providing some gap by Xend or duration between the PoSS monitoring window and the DRX ON period may facilitate providing some time budget for the UE 660 to process the PoSS, judge whether to wake up, and ramp up to start monitoring PDCCH from the start of DRX ON.

Like in the case of one parameter, the parameter pairs can be added in the IE search space configured with the PS-RNTI. Besides, each parameter pair for one of multiple search spaces may be configured separately, using multiple RNTIs.

DRX Configuration Specific PoSS Time Window Configuration

An example of a configuration of the PoSS time window being specific to a DRX configuration is shown in FIG. 14. The start of the PoSS monitoring window is defined an offset, which may be called Ystart, and which is configured by RRC with the DRX configuration.

If the UE 660 is in DRX off state, it shall monitor for the PoSS in all monitoring configurations of all valid search spaces with which it is configured, which fall within the PoSS time window spanning from the slot indicated by Ystart before the next subsequent DRX ON duration until the starting of the DRX ON duration. As can be seen from FIG. 14, the PoSS time window has the same number of slots for all search spaces.

The parameter/offset Xstart can be indicated in terms of number of slots, or number of monitoring occasions. For instance, if the offset is indicated as a number of monitoring occasions, the number of occasions may be counted as a total number of monitoring occasions counted across the configured search spaces.

Alternatively, it may be indicated as a number of monitoring occasions per search space. In this case, the indicated number of occasions is counted in each search space, and the total number of occasions is the indicated number times the number of search spaces.

As a variation, also when configuring a PoSS time window specific to the DRX configuration, two values can be configured to define the monitoring window, e.g., the start and end or its duration, rather than using a single value. An example of such a configuration is shown in FIG. 15.

For instance, the configuration of the PoSS time window can include a parameter pair {Ystart, Yend} corresponding to a first and second offset with respect to the start of the DRX On period, or a parameter pair {Ystart, duration or Yduration} corresponding to an offset and a duration. As a further alternative, a parameter pair {Yend, duration} may be configured. Similar to the above-described embodiments. Moreover, also in this example, the monitoring occasions will apply and will be monitored by the UE 660 that fall within the monitoring window relative to the next consecutive DRX ON duration or period.

As for the search space specific configuration shown in FIG. 13, a benefit in providing some gap by a second parameter Yend or duration between PoSS monitoring and DRX ON is that it provides some time budget for UE to process PoSS, judge whether to wake up and ramp up to start monitoring PDCCH from the start of DRX ON.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

The present disclosure provides a user equipment, UE comprising a transceiver which, in operation, receives a configuration of a PoSS, power saving signal, time window for monitoring a PoSS and preceding a DRX, discontinuous reception, ON period for monitoring a PDCCH, physical downlink control channel, wherein the PoSS indicates whether or not the UE is allowed to skip monitoring for the PDCCH in the DRX ON period, and circuitry which, in operation, determines, based on the configuration, the PoSS time window, and controls the transceiver to perform monitoring for the PoSS within the PoSS time window.

For instance, if the PoSS indicates that the UE is allowed to skip monitoring for the PDCCH in the DRX ON period, the circuitry, in operation, controls the transceiver to skip monitoring for the PDCCH in the DRX ON period.

For example, the configuration of the PoSS time window comprises an offset indicating a start of the PoSS time window relative to start of the DRX ON period.

In some embodiments, the PoSS time window ends at the start of the DRX ON period.

In some embodiments, a first offset indicates the start of the PoSS time window, and the configuration of the PoSS time window comprises a second offset indicating an end of the PoSS time window relative to the start of the DRX ON period or a duration of the PoSS time window.

In some embodiments, the configuration of the PoSS time window is specific to the search space, e.g., the configuration of the PoSS time window is search space specific.

For instance, the UE is configured with one or more search spaces, comprising monitoring occasions for monitoring the PoSS, and the transceiver, in operation, performs monitoring for the PoSS on the monitoring occasions that fall within the PoSS time window, e.g., the one or more search spaces include said search space of the aforementioned embodiments in which the configuration of the PoSS time window is specific to the search space.

In some embodiments, the configuration of the PoSS time window is specific to a DRX configuration.

In some embodiments, the PoSS time window is indicated as a number of slots.

In some embodiments, the PoSS time window is indicated as a number of monitoring occasions.

In some embodiments, the circuitry, in operation, controls the transceiver to monitor for a repetition of the PoSS within the PoSS time window.

For instance, the PoSS time window is included in a plurality of PoSS time windows each of which is configured for a search space out of a plurality of search spaces each associated with one of a plurality of beams.

Further provided is a scheduling node comprising circuitry which, in operation, determines a configuration of a PoSS, power saving signal, time window for monitoring, by a user equipment, of a PoSS and preceding a DRX, discontinuous reception, ON period for monitoring a PDCCH, physical downlink control channel, wherein the PoSS indicates whether or not skipping monitoring for the PDCCH in the DRX ON period is allowed, and a transceiver which, in operation, transmits the configuration of the PoSS time window, and transmits the PoSS within the PoSS time window.

For instance, if the PoSS indicates that skipping monitoring for the PDCCH in the DRX ON period is allowed, the transceiver, in operation, skips transmitting the PDCCH in the DRX ON period.

For example, the configuration of the PoSS time window comprises an offset indicating a start of the PoSS time window relative to start of the DRX ON period.

In some embodiments, the PoSS time window ends at the start of the DRX ON period.

In some embodiments, a first offset indicates the start of the PoSS time window, and the configuration of the PoSS time window comprises a second offset indicating an end of the PoSS time window relative to the start of the DRX ON period or a duration of the PoSS time window.

In some embodiments, the configuration of the PoSS time window is specific to the search space, e.g., the configuration of the PoSS time window is search space specific.

For instance, the circuitry, in operation, determines and generates a configuration of one or more search spaces, comprising monitoring occasions for monitoring the PoSS, and the transceiver, in operation, transmits the PoSS on at least one of the monitoring occasions that fall within the PoSS time window. e.g., the one or more search spaces include said search space of the aforementioned embodiments in which the configuration of the PoSS time window is specific to the search space.

In some embodiments, the configuration of the PoSS time window is specific to a DRX configuration.

In some embodiments, the PoSS time window is indicated as a number of slots.

In some embodiments, the PoSS time window is indicated as a number of monitoring occasions.

For instance, the transceiver, in operation, transmits a repetition of the PoSS within the PoSS time window.

In some embodiments, the PoSS time window is included in a plurality of PoSS time windows each of which is configured for a search space out of a plurality of search spaces each associated with one of a plurality of beams, and the transceiver, in operation, transmits each of a plurality of PoSS including said PoSS on a respective one of the plurality of beams within the respectively configured PoSS time window in accordance with the associated search space.

Also provided is a communication method for a UE, comprising receiving a configuration of a PoSS, power saving signal, time window for monitoring a PoSS and preceding a DRX, discontinuous reception, ON period for monitoring a PDCCH, physical downlink control channel, wherein the PoSS indicates whether or not the UE is allowed to skip monitoring for the PDCCH in the DRX ON period, and determining, based on the configuration, the PoSS time window, and monitoring for the PoSS within the PoSS time window.

In some embodiments, the method includes, if the PoSS indicates that the UE is allowed to skip monitoring for the PDCCH in the DRX ON period, skipping monitoring for the PDCCH in the DRX ON period.

For instance, the configuration of the PoSS time window comprises an offset indicating a start of the PoSS time window relative to start of the DRX ON period.

For example, wherein the PoSS time window ends at the start of the DRX ON period.

For instance, a first offset indicates the start of the PoSS time window, and the configuration of the PoSS time window comprises a second offset indicating an end of the PoSS time window relative to the start of the DRX ON period or a duration of the PoSS time window.

In some embodiments, the configuration of the PoSS time window is specific to the search space, e.g., the configuration of the PoSS time window is search space specific.

In some embodiments for a UE configured with one or more search spaces, comprising monitoring occasions for monitoring the PoSS, method includes monitoring for the PoSS on the monitoring occasions that fall within the PoSS time window, e.g., the one or more search spaces include said search space of the aforementioned embodiments in which the configuration of the PoSS time window is specific to the search space.

For example, the configuration of the PoSS time window is specific to a DRX configuration.

In some embodiments, the PoSS time window is indicated as a number of slots.

In some embodiments, the PoSS time window is indicated as a number of monitoring occasions.

For instance, the method includes monitoring for a repetition of the PoSS within the PoSS time window.

For example, the PoSS time window is included in a plurality of PoSS time windows each of which is configured for a search space out of a plurality of search spaces each associated with one of a plurality of beams.

Further provided is a communication method for a scheduling node, comprising determining a configuration of a PoSS, power saving signal, time window for monitoring, by a user equipment, of a PoSS and preceding a DRX, discontinuous reception, ON period for monitoring a PDCCH, physical downlink control channel, wherein the PoSS indicates whether or not skipping monitoring for the PDCCH in the DRX ON period is allowed, transmitting the configuration of the PoSS time window, and transmitting the PoSS within the PoSS time window.

For instance, the method includes, if the PoSS indicates that the UE is allowed to skip monitoring for the PDCCH in the DRX ON period, skipping transmission of the PDCCH in the DRX ON period.

For example, the configuration of the PoSS time window comprises an offset indicating a start of the PoSS time window relative to start of the DRX ON period.

In some embodiments, the PoSS time window ends at the start of the DRX ON period.

In some embodiments, a first offset indicates the start of the PoSS time window, and the configuration of the PoSS time window comprises a second offset indicating an end of the PoSS time window relative to the start of the DRX ON period or a duration of the PoSS time window.

In some embodiments, the configuration of the PoSS time window is specific to the search space, e.g., the configuration of the PoSS time window is search space specific.

For example, the method includes configuring one or more search spaces, comprising monitoring occasions for monitoring the PoSS, and transmitting the PoSS on at least one of the monitoring occasions that fall within the PoSS time window, e.g., the one or more search spaces include said search space of the aforementioned embodiments in which the configuration of the PoSS time window is specific to the search space.

In some embodiments, the configuration of the PoSS time window is specific to a DRX configuration.

For instance, the PoSS time window is indicated as a number of slots.

For instance, the PoSS time window is indicated as a number of monitoring occasions.

In some embodiments, the method includes transmitting a repetition of the PoSS within the PoSS time window.

For example, the PoSS time window is included in a plurality of PoSS time windows each of which is configured for a search space out of a plurality of search spaces each associated with one of a plurality of beams, and the method includes transmitting each of a plurality of PoSS including said PoSS on a respective one of the plurality of beams within the respectively configured PoSS time window in accordance with the associated search space.

Summarizing provided is a user equipment (UE), a scheduling node, and communication methods for UE and, respectively, scheduling node. The UE comprises a transceiver which, in operation, receives a configuration of a PoSS, power saving signal, time window for monitoring a PoSS and preceding a DRX, discontinuous reception, ON period for monitoring a PDCCH, physical downlink control channel, wherein the PoSS indicates whether or not the UE is allowed to skip monitoring for the PDCCH in the DRX ON period and circuitry which, in operation, determines, based on the configuration, the PoSS time window, and controls the transceiver to perform monitoring for the PoSS within the PoSS time window.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A communication apparatus, comprising:
    a transceiver which, in operation, receives a configuration of a PoSS (power saving signal) time window for monitoring a PoSS, the PoSS time window preceding a DRX (discontinuous reception) ON period for monitoring a PDCCH (physical downlink control channel), wherein the PoSS indicates whether or not the communication apparatus starts monitoring for the PDCCH in the DRX ON period; and
    circuitry which, in operation, determines, based on the configuration, the PoSS time window, and controls the transceiver to perform monitoring for the PoSS within the PoSS time window,
    wherein the PoSS time window ends at the start of the DRX ON period.

2. The communication apparatus according to claim 1, wherein, if the PoSS indicates that the communication apparatus does not start monitoring for the PDCCH in the DRX ON period, the circuitry, in operation, controls the transceiver not to start monitoring for the PDCCH in the DRX ON period.

3. The communication apparatus according to claim 1, wherein the configuration of the PoSS time window comprises a first offset indicating a start of the PoSS time window relative to the start of the DRX ON period.

4. The communication apparatus according to claim 3, wherein a second offset is used which indicates a gap between an end of the PoSS time window and the start of the DRX ON period.

5. The communication apparatus according to claim 1, which is configured with one or more search spaces comprising monitoring occasions for monitoring the PoSS, and the transceiver, in operation, performs monitoring for the PoSS on the monitoring occasions within the PoSS time window.

6. The communication apparatus according to claim 5, wherein a single location for the monitoring occasions is configured relative to the start of the DRX ON period.

7. The communication apparatus according to claim 1, wherein a duration of the monitoring of the PoSS in search spaces is indicated as a number of slots.

8. The communication apparatus according to claim 1, which is configured with one or more search spaces comprising monitoring occasions, and wherein a number of the monitoring occasions corresponds to a number of monitoring symbols multiplied by a number of monitoring slots.

9. The communication apparatus according to claim 1, wherein the configuration of the PoSS is received by means of an RRC signaling.

10. The communication apparatus according to claim 1, wherein the PoSS is monitored outside of active time.

11. A scheduling node, comprising:
    circuitry which, in operation, determines a configuration of a PoSS (power saving signal) time window for monitoring, by a communication apparatus, of a PoSS, the PoSS window preceding a DRX (discontinuous reception) ON period for monitoring a PDCCH (physical downlink control channel), wherein the PoSS indicates whether or not monitoring for the PDCCH in the DRX ON period is started; and
    a transceiver which, in operation, transmits the configuration of the PoSS time window, and transmits the PoSS within the PoSS time window,
    wherein the PoSS time window ends at the start of the DRX ON period.

12. The scheduling node according to claim 11, wherein the transceiver, in operation, transmits a repetition of the PoSS within the PoSS time window.

13. The scheduling node according to claim 11, wherein the PoSS time window is included in a plurality of PoSS time windows each of which is configured for a search space out of a plurality of search spaces each associated with one of a plurality of beams, and the transceiver, in operation, transmits each of a plurality of PoSS including said PoSS on a respective one of the plurality of beams within the respectively configured PoSS time window in accordance with the associated search space.

14. A communication method for a communication apparatus, comprising:
    receiving a configuration of a PoSS (power saving signal) time window for monitoring a PoSS, the PoSS time window preceding a DRX (discontinuous reception) ON period for monitoring a PDCCH (physical downlink control channel), wherein the PoSS indicates whether or not the communication apparatus starts monitoring for the PDCCH in the DRX ON period; and
    determining, based on the configuration, the PoSS time window, and monitoring for the PoSS within the PoSS time window,
    wherein the PoSS time window ends at the start of the DRX ON period.

15. A communication method for a scheduling node, comprising:
    determining a configuration of a PoSS (power saving signal) time window for monitoring, by a communication apparatus, of a PoSS, the PoSS window preceding a DRX (discontinuous reception) ON period for monitoring a PDCCH (physical downlink control channel), wherein the PoSS indicates whether or not monitoring for the PDCCH in the DRX ON period is started;
    transmitting the configuration of the PoSS time window; and
    transmitting the PoSS within the PoSS time window,
    wherein the PoSS time window ends at the start of the DRX ON period.

16. An integrated circuit which, in operation, controls a process of a communication apparatus, the process comprising:
    receiving a configuration of a PoSS (power saving signal) time window for monitoring a PoSS, the PoSS time window preceding a DRX (discontinuous reception) ON period for monitoring a PDCCH (physical downlink control channel), wherein the PoSS indicates whether or not the communication apparatus starts monitoring for the PDCCH in the DRX ON period; and determining, based on the configuration, the PoSS time window, and monitoring for the PoSS within the PoSS time window, wherein the PoSS time window ends at the start of the DRX ON period.

17. An integrated circuit which, in operation, controls a process of a scheduling node, the process comprising:

determining a configuration of a PoSS (power saving signal) time window for monitoring, by a communication apparatus, of a PoSS, the PoSS window preceding a DRX (discontinuous reception) ON period for monitoring a PDCCH (physical downlink control channel), wherein the PoSS indicates whether or not monitoring for the PDCCH in the DRX ON period is started;

transmitting the configuration of the PoSS time window; and transmitting the PoSS within the PoSS time window, wherein the PoSS time window ends at the start of the DRX ON period.

* * * * *